(No Model.)
G. E. MERTZ.
ROTARY CUTTER FOR TURNING WOOD MOLDINGS.
No. 561,721. Patented June 9, 1896.
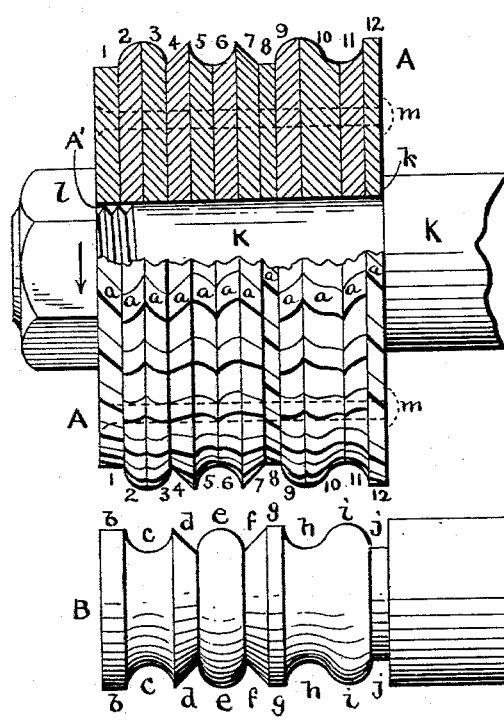
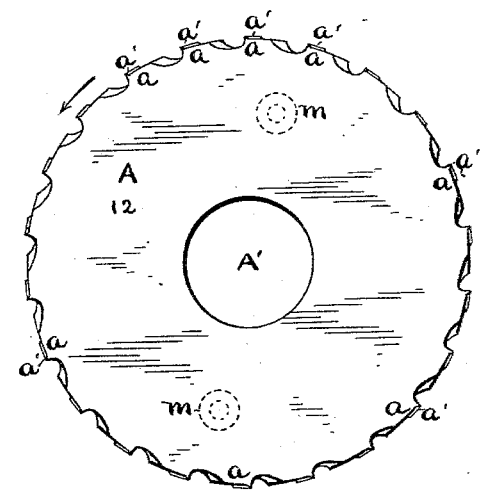
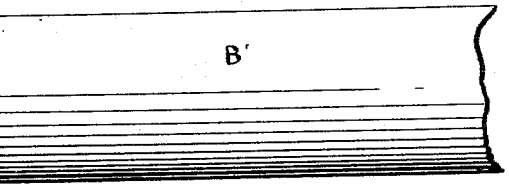
WITNESSES.
Hnry J. Stapelton
George M. Cady
INVENTOR.
George E. Mertz
by Edson Salisbury Jones
Attorney

UNITED STATES PATENT OFFICE.

GEORGE E. MERTZ, OF PORT CHESTER, NEW YORK.

ROTARY CUTTER FOR TURNING WOOD MOLDINGS.

SPECIFICATION forming part of Letters Patent No. 561,721, dated June 9, 1896.

Application filed November 24, 1891. Serial No. 412,965. (No model.)

*To all whom it may concern:*

Be it known that I, GEORGE E. MERTZ, of Port Chester, in the county of Westchester and State of New York, have invented a new and useful Improvement in Rotary Cutters for Turning Wood Moldings; and I do hereby declare the following specification, taken in connection with the accompanying drawings, forming a part of the same, to be a description thereof.

This invention relates to a circular cutter which is intended to be mounted upon a shaft or spindle in a turning-lathe and to be rotated to turn wood moldings; and it consists in certain features of construction and arrangement hereinafter described and claimed.

Referring to the drawings, Figure 1 represents a top view and partial section of a cutter embodying the invention; Fig. 2 shows an end view of the same; Fig. 3 represents a stick with a portion turned or molded by such cutter.

The cutter A (shown in the drawings) is designed to produce the pattern or molding B (shown in Fig. 3) upon a stick, as B', which molding is composed of the following sections or members: a flat member $b$, a concave member $c$, a beveled or slanting member $d$, a half-round or convex member $e$, a beveled or slanting member $f$, a flat member $g$, a concave member $h$, a convex member $i$, and a flat member $j$. For turning such compound moldings at one operation, the cutter is preferably composed of a series or stack of steel disks or circular plates 1 2 3 4 5 6 7 8 9 10 11 12, the perimeters of which are provided with cutting-teeth $a$, formed on the disks, such stack of disks having a central hole A' and being intended to be mounted upon a shaft or spindle, as K, and to be rigidly secured upon such shaft in any suitable manner, as by being clamped against a shoulder $k$ on the shaft by a nut $l$, threaded upon the shaft. If it be desired to bind the disks together so they will not be relatively displaced when they are removed from the shaft, they may be pinned together by rivets $m$, as indicated by dotted lines in Figs. 1 and 2. The member $b$ of the molding will be produced by the part 1 of the cutter, the member $c$ of the molding by the parts 2 3 of the cutter, the member $d$ by the part 4, the member $e$ by the parts 5 6, the member $f$ by the part 7, the member $g$ by the part 8, the member $h$ by the part 9 and a portion of the part 10, the member $i$ by the remaining portion of the part 10 and by the part 11, and the member $j$ by the part 12 of the cutter.

In making the cutter the circular plates or disks, each of the desired diameter and of proper thickness for its definite office, may be clamped together in a stack and the perimeter of the stack be then molded or grooved circumferentially by proper turning-tools, so that the cutter as a whole will have the required edge contour to produce the desired molding. The disks may then be separated and cutting-teeth be formed by proper tools upon the perimeter of each disk, such teeth extending diagonally upon the perimeter of the disk, so as to secure a draw or sliding cut. If preferred, however, each disk may be molded or have its edge contour given it disassociated from the others.

To be effective in action, the cutting edges of the teeth $a$ should be higher or at a greater distance from the axis of the cutter than those portions of the teeth that lie behind or in the rear of the cutting edge. This may be accomplished by slanting the teeth downwardly or inwardly from the cutting edge toward the heel, but as the resharpening of the teeth so formed would gradually change the edge contour of the cutter I prefer to secure the result by making the peripheries of the teeth arcs of a circle whose center is that of the cutter, and upsetting or raising a bur $a'$ on the cutting edges of the teeth, as shown in Fig. 2, by forcing up said edges with a steel tool, for by this construction I have found that a cleaner cut is produced and the contour of the cutter is better preserved when resharpening becomes necessary. This construction enables the cutter to be produced at much less expense than when the teeth are slanted downwardly and rearwardly from the cutting edge, and the resharpening can be more quickly and easily performed than by the old form of grinding. When the cutting edges become dull, they can readily be resharpened by forcing up the burs $a'$ again by means of a steel tool.

For producing the flat members, such as $b$ $g j$, of a molding, it is immaterial in what direction the cutting-teeth extend upon the perimeter of those parts of the cutter which are to mold said members; but in order to produce the cleanest cut and to prevent tearing of the wood on the convex, concave, and beveled or slanting members of a molding I have discovered that the cutting-teeth on those parts of the cutter which are to produce such members should extend diagonally from the greatest diameter of such parts toward the least diameter of such parts, respectively, and in the direction the cutter is to revolve to perform its work, as shown in Fig. 1, thereby securing a draw or sliding cut with the grain of the wood instead of against the grain, which I have found to be a very important feature in producing first-class work.

Having described my invention, what I claim, and desire to secure by Letters Patent, is—

1. A rotary cutter for wood moldings consisting of a series or stack of disks the circumferences of which are provided with cutting-teeth whose perimeters are arcs of circles having the same center as that of the cutter, the cutting edges of the teeth being raised or upset into a bur, substantially as set forth.

2. A rotary cutter for wood moldings having its circumference provided with cutting-teeth whose perimeters are arcs of circles having the same center as that of the cutter, the said teeth extending diagonally upon the circumference, and having their cutting edges raised or upset into a bur, substantially as set forth.

3. A rotary cutter for wood moldings having its circumference grooved or formed with the proper edge contour to produce the desired molding and provided with cutting-teeth whose perimeters are arcs of circles having the same center as that of the cutter and whose cutting edges are raised or upset into a bur, those parts of the circumference of the cutter that are convex, concave, beveled or slanting having the teeth thereon extending diagonally from the greatest toward the least diameter of such parts, respectively, and in the direction that the cutter is to revolve, substantially as set forth.

GEO. E. MERTZ.

Witnesses:
EDSON SALISBURY JONES,
JAMES H. MCCULLOUGH.